(12) United States Patent
Konishi et al.

(10) Patent No.: US 11,162,838 B2
(45) Date of Patent: Nov. 2, 2021

(54) MULTIPLE-OPTICAL AXIS PHOTOELECTRIC SENSOR

(71) Applicant: OMRON Corporation, Kyoto (JP)

(72) Inventors: Yasuchika Konishi, Kusatsu (JP); Keisaku Kikuchi, Kusatsu (JP); Yuya Yamada, Kusatsu (JP); Satoshi Nishiuchi, Takatsuki (JP)

(73) Assignee: OMRON Corporation, Kyoto (JP)

( * ) Notice: Subject to any disclaimer, the term of this patent is extended or adjusted under 35 U.S.C. 154(b) by 0 days.

(21) Appl. No.: 16/641,684

(22) PCT Filed: Oct. 30, 2018

(86) PCT No.: PCT/JP2018/040305
§ 371 (c)(1),
(2) Date: Feb. 25, 2020

(87) PCT Pub. No.: WO2019/102801
PCT Pub. Date: May 31, 2019

(65) Prior Publication Data
US 2020/0393295 A1 Dec. 17, 2020

(30) Foreign Application Priority Data
Nov. 27, 2017 (JP) .............................. JP2017-226839

(51) Int. Cl.
*G01J 1/44* (2006.01)
*G01V 8/20* (2006.01)
*G01J 1/02* (2006.01)

(52) U.S. Cl.
CPC ................ *G01J 1/44* (2013.01); *G01J 1/0219* (2013.01); *G01J 2001/448* (2013.01); *G01V 8/20* (2013.01)

(58) Field of Classification Search
CPC .................................. G01V 8/20; F16P 3/144
See application file for complete search history.

(56) References Cited

U.S. PATENT DOCUMENTS

| 6,414,603 B1 * | 7/2002 | Yamaguchi | F16P 3/144 |
| | | | 250/221 |
| 2007/0125938 A1 | 6/2007 | Kikuchi et al. | |

(Continued)

FOREIGN PATENT DOCUMENTS

| CN | 1519784 A | 8/2004 |
| CN | 1983488 A | 6/2007 |

(Continued)

OTHER PUBLICATIONS

English translation of the International Search Report("ISR") of PCT/JP2018/040305 dated Feb. 5, 2019.

(Continued)

*Primary Examiner* — Thanh Luu
(74) *Attorney, Agent, or Firm* — Metrolex IP Law Group, PLLC.

(57) ABSTRACT

The present invention allows a user to easily grasp which light receiving section is in what light reception state. The multiple-optical-axis photoelectric sensor (10) includes: a plurality of light receiving sections (110); a display section (120) which is provided in the vicinity of a corresponding light receiving section among the plurality of light receiving sections (110), the display section (120) displaying a light reception state of the corresponding light receiving section; and a display control section (103) which causes the display section (220) and the display section (120) to simultaneously display the light reception state.

4 Claims, 6 Drawing Sheets

(56) References Cited

U.S. PATENT DOCUMENTS

2008/0179505 A1\* 7/2008 Inoue ..................... G01V 8/20
 250/221
2012/0032812 A1\* 2/2012 Kozawa ............ H03K 17/9629
 340/635

FOREIGN PATENT DOCUMENTS

| CN | 103066980 A | 4/2013 |
|---|---|---|
| EP | 2584703 A1 | 4/2013 |
| JP | H11-345548 A | 12/1999 |
| JP | 2002-124168 A | 4/2002 |
| JP | 2003-298105 A | 10/2003 |
| JP | 2004-214899 A | 7/2004 |
| JP | 2008-181788 A | 8/2008 |
| JP | 2008-277163 A | 11/2008 |

OTHER PUBLICATIONS

Written Opinion ("WO") of PCT/JP2018/040305 dated Feb. 5, 2019.
Chinese Office Action dated Aug. 11, 2021 for the counterpart Chinese patent application.

\* cited by examiner

MULTIPLE-OPTICAL AXIS PHOTOELECTRIC SENSOR

TECHNICAL FIELD

The present invention relates to a multiple-optical-axis photoelectric sensor including a display section.

BACKGROUND ART

Conventionally, a multiple-optical-axis photoelectric sensor is known which detects that an object has intruded into a detection area. The multiple-optical-axis photoelectric sensor includes a light projector having a plurality of light projecting elements and a light receiver having a plurality of light receiving elements. The plurality of light projecting elements are arranged to face the respective plurality of light receiving elements, and thus optical axes are formed. The multiple-optical-axis photoelectric sensor repeats a light projecting/receiving operation in which each of the light projecting elements emits light sequentially in predetermined light projecting cycles with respect to the facing light receiving element and the light receiving element receives the light. In addition, the multiple-optical-axis photoelectric sensor detects blockage of an optical axis based on a light reception signal from the light receiving element, and thus detects intrusion of an object into the detection area.

A multiple-optical-axis photoelectric sensor which displays a light entrance state with respect to a light receiver is also known. For example, Patent Literature 1 discloses a configuration in which a light receiver includes a display section, a light entrance state with respect to the light receiver is determined, and a result of the determination is displayed on the display section.

CITATION LIST

Patent Literature

[Patent Literature 1]
Japanese Patent Application Publication Tokukai No. 2003-298105 (Publication date: Oct. 17, 2003)

SUMMARY OF INVENTION

Technical Problem

However, the above described conventional technique has a problem that a user cannot easily grasp which light receiving element is in a good or bad light reception state, because the display section is arranged only at an end part of a light receiving surface.

An aspect of the present invention is accomplished in view of the above described problem, and its object is to provide a multiple-optical-axis photoelectric sensor with which a user can easily grasp which light receiving element (light receiving section) is in what light reception state.

Solution to Problem

In order to attain the object, a multiple-optical-axis photoelectric sensor in accordance with an aspect of the present invention includes: a light projector; a light receiver; a plurality of light receiving sections; a light receiver display section which is provided in the vicinity of a corresponding light receiving section among the plurality of light receiving sections, the light receiver display section displaying a light reception state of the corresponding light receiving section; a light projector display section which displays the light reception state; and a display synchronizing section which causes the light projector display section and the light receiver display section to simultaneously display the light reception state.

Advantageous Effects of Invention

An aspect of the present invention brings about an effect that the user can easily recognize which light receiving section is in what light reception state. In other words, the user can easily recognize which light receiving section is in a good or bad light reception state by checking the display section. Moreover, on the light projector display section also, the light reception state of the light receiving section is displayed simultaneously with the light receiver display section. Therefore, the user can recognize the light reception state of the light receiving section by checking either the light projector or the light receiver.

DESCRIPTION OF EMBODIMENTS

Embodiment 1

§ 1 Application Example

[Appearance Configuration of Multiple-Optical-Axis Photoelectric Sensor]

Figure 2:
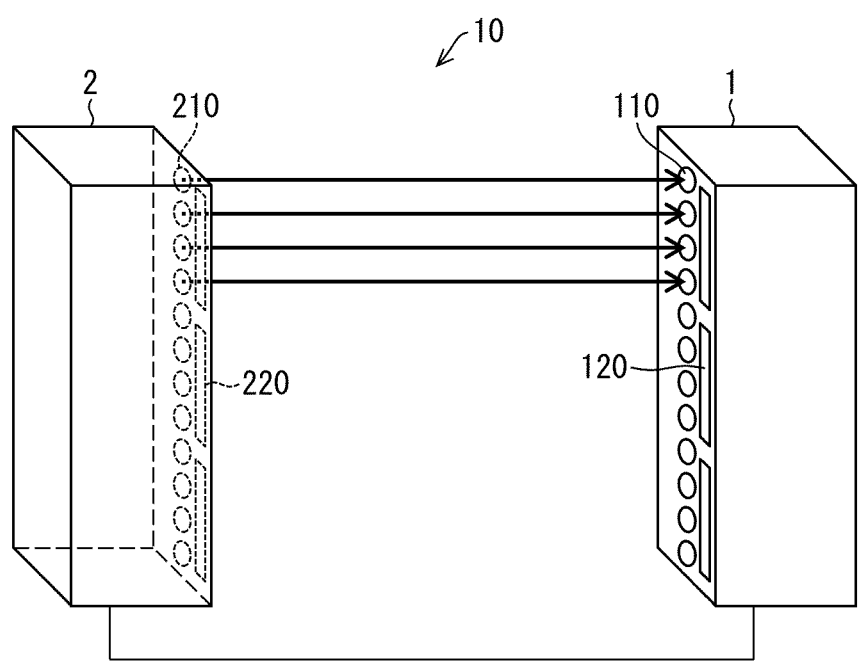
FIG. 2 is a diagram illustrating an appearance example of the multiple-optical-axis photoelectric sensor.

First, with reference to FIG. 2, an appearance configuration of a multiple-optical-axis photoelectric sensor 10 in accordance with Embodiment 1 will be described. FIG. 2 is a diagram illustrating an appearance example of the multiple-optical-axis photoelectric sensor 10.

As illustrated in FIG. 2, the multiple-optical-axis photoelectric sensor 10 includes a light projector 2 and a light receiver 1, which are arranged to face each other via a predetermined detection region. The light projector 2 as a whole has a pillar shape and, for example, 12 light projecting sections (light projecting element) 210 are arranged in a row on a facing surface facing the light receiver 1. The light receiver 1 as a whole has a pillar shape and, for example, 12 light receiving sections (light receiving element) 110 are arranged in a row on a facing surface facing the light projector 2. The light projecting sections 210 and the light receiving sections 110 facing each other form respective optical axes.

In Embodiment 1, a display section 120 (light receiver display section) is provided on a side of the light receiving sections 110 on the facing surface of the light receiver 1. For example, display sections 120 are provided so as to correspond to respective equally divided three groups of the light receiving sections 110 which are arranged in a row. In this case, therefore, three display sections 120 are provided. For example, in the example illustrated in FIG. 2, four light receiving sections 110 from the top correspond to an upper display section 120, 5th through 8th light receiving sections 110 from the top correspond to a middle display section 120, and 9th through 12th light receiving sections 110 from the top correspond to a lower display section 120.

That is, in Embodiment 1, the plurality of light receiving sections 110 are arranged in a row, and the display sections 120 are provided in parallel with a direction, in which the row extends, such that one display section 120 corresponds to two or more light receiving sections 110.

Note that the display section 120 can be provided in the vicinity of the corresponding light receiving sections 110, instead of on the side of the corresponding light receiving sections 110 on the facing surface of the light receiver 1. For example, the display section 120 can be provided on a surface perpendicular to the facing surface of the light receiver 1, instead of on the facing surface. According to the configuration, in a case where a user exists in a direction perpendicular to the optical axis of the multiple-optical-axis photoelectric sensor 10, the user can easily confirm the display section 120.

A display section 220 (light projector display section) is provided on the side of the light projecting sections 210 on the facing surface of the light projector 2 in a manner similar to that of the display section 120. For example, display sections 220 are provided so as to correspond to respective equally divided three groups of the light projecting sections 210 which are arranged in a row. In this case, therefore, three display sections 220 are provided. Note that the display section 220 can also be provided in the vicinity of the corresponding light projecting sections 210, instead of on the side of the corresponding light projecting sections 210 on the facing surface of the light projector 2, as with the display section 120.

The light projecting section 210 is configured using a publicly known technique. Although detailed descriptions are omitted accordingly, the light projecting section 210 includes a light projecting element, and projects light at a determined point in time based on an instruction given from a light-projecting process section 201 which will be described later. The light projecting element can be, for example, a light emitting diode (LED). Each of the plurality of light projecting sections 210 provided in the light projector 2 sequentially projects light in predetermined cycles.

The light receiving section 110 is configured using a publicly known technique. Although detailed descriptions are omitted accordingly, the light receiving section 110 includes a light receiving element and, upon receipt of light, notifies a light-receiving process section 101 (described later) of a light reception signal. The light receiving element can be, for example, a photodiode.

The display section 120 displays a light reception state of the corresponding light receiving section 110.

According to Embodiment 1, a light reception state of a light receiving section 110 is displayed on the display section 120 and the display section 220 of the multiple-optical-axis photoelectric sensor 10. The display section 120 is provided on the side of the corresponding light receiving section 110, and the display section 220 is provided on the side of the light projecting section 210. According to the configuration, the user can clearly recognize which light receiving section 110 is in a good or bad light reception state.

§ 2 Configuration Example

[Main Part Configuration of Multiple-Optical-Axis Photoelectric Sensor]

Figure 1:
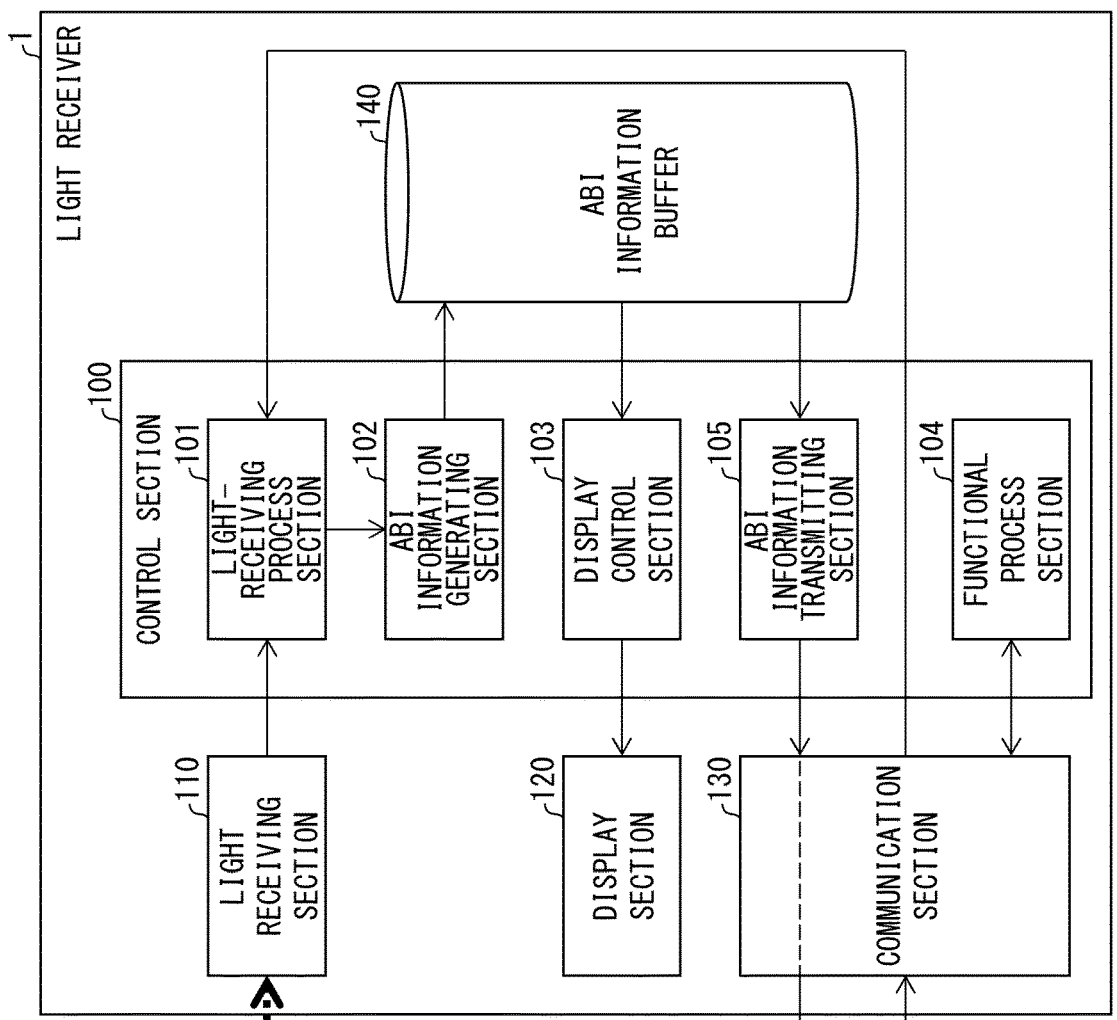
FIG. 1 is a block diagram illustrating a configuration example of main parts of a multiple-optical-axis photoelectric sensor in accordance with Embodiment 1.
Figure 1:
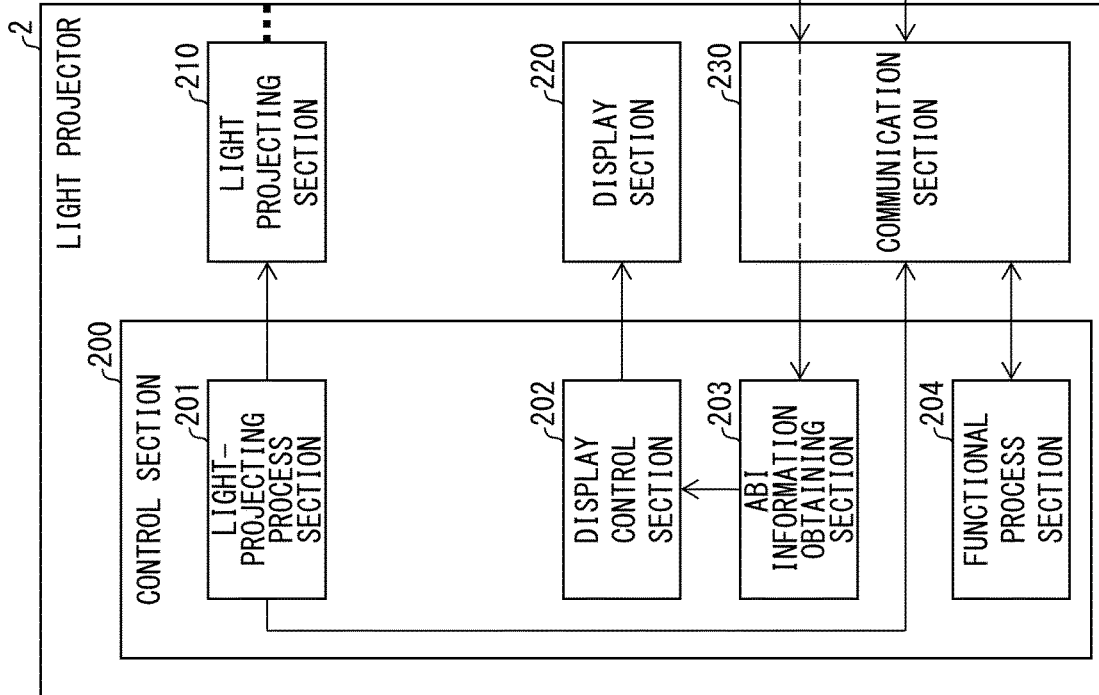

Next, the following describes a main part configuration of the multiple-optical-axis photoelectric sensor 10 with reference to FIG. 1. FIG. 1 is a block diagram illustrating a configuration example of main parts of the multiple-optical-axis photoelectric sensor 10.

As illustrated in FIG. 2, the multiple-optical-axis photoelectric sensor 10 includes the light receiver 1 and the light projector 2. The light receiver 1 includes a control section 100, a light receiving section 110, a display section 120, a communication section 130, and an ABI information buffer 140.

The control section 100 comprehensively carries out various types of control in the light receiver 1. The control section 100 includes a light-receiving process section 101, an ABI information generating section 102, a display control section (display synchronizing section) 103, a functional process section 104, and an ABI information transmitting section (display synchronizing section) 105.

The light-receiving process section 101 carries out a light-receiving process on light received at the light receiving section 110 in predetermined cycles corresponding to cycles of the light-projecting process of the light-projecting process section 201 of the light projector 2, and notifies the ABI information generating section 102 of the result.

The ABI information generating section 102 generates area beam indicator (ABI) information indicating a light reception state, which is the result of the light-receiving process carried out in the light-receiving process section 101. The ABI information thus generated is stored in an ABI information buffer 140.

The display control section 103 causes the display section 120 to display the light reception state of the light receiving section 110 using the ABI information stored in the ABI information buffer 140. More specifically, the display control section 103 causes the display section 120 to display the light reception state of the light receiving section 110 using ABI information of one previous cycle in cycles of the light projecting/receiving process.

The display control section 103 notifies the ABI information transmitting section 105 of a point in time to display when the display control section 103 causes the display section 120 to display the light reception state of the light receiving section 110 by using the ABI information of the one previous cycle. This allows the display section 120 in the light receiver 1 and the display section 220 in the light projector 2 to simultaneously display the light reception state of the light receiving section 110.

That is, the light receiving section 110 carries out the light-receiving process in predetermined cycles and, in a current cycle, the display section 120 displays a light reception state of one previous cycle, and the display control section 103 causes the display section 220 to display the light reception state of the one previous cycle.

The functional process section 104 carries out various functions in the light receiver 1 of the multiple-optical-axis photoelectric sensor 10.

The ABI information transmitting section 105 transmits ABI information stored in the ABI information buffer 140 to the light projector 2 via the communication section 130. More specifically, the ABI information transmitting section 105 transmits ABI information of the one previous cycle in cycles of the light projecting/receiving process to the light projector 2 at a point in time notified by the display control section 103.

That is, the display control section 103 and the ABI information transmitting section 105 transmit an instruction for causing the display section 220 to display the light reception state of the one previous cycle to the light projector 2 during the light-receiving process in the current cycle.

The ABI information buffer 140 temporarily stores ABI information created by the ABI information generating section 102.

The communication section 130 communicates with the light projector 2.

The light projector 2 includes a control section 200, a light projecting section 210, a display section 220, and a communication section 230.

The control section 200 comprehensively carries out various types of control in the light projector 2. The control section 200 includes a light-projecting process section 201, a display control section 202, and an ABI information obtaining section 203.

The light-projecting process section 201 causes the light projecting section 210 to project light in predetermined cycles.

The display control section 202 causes the display section 220 to display a light reception state of a light receiving section 110 of the light receiver 1 using ABI information received by the ABI information obtaining section 203 from the light receiver 1.

The ABI information obtaining section 203 receives ABI information from the light receiver 1 via the communication section 230.

The functional process section 204 carries out various functions in the light projector 2 of the multiple-optical-axis photoelectric sensor 10.

The communication section 230 communicates with the light receiver 1.

As described above, the light receiver 1 of the multiple-optical-axis photoelectric sensor 10 in accordance with Embodiment 1 is configured to include the plurality of light receiving sections 110, the display section 120, and the display control section 103. The display section 120 is provided in the vicinity of corresponding light receiving sections 110 of the plurality of light receiving sections 110, and displays a light reception state of the corresponding light receiving sections 110. The display control section 103 causes the light reception state to be displayed on the display section 220 of the light projector 2 included in the multiple-optical-axis photoelectric sensor simultaneously with display in the light receiving section 110.

In the above described embodiment, the display on the display section 120 and the display on the display section 220 are synchronized by the display control section 103 and the ABI information transmitting section 105. Note, however, that the configuration for synchronizing the display on the display section 120 and the display on the display section 220 is not limited to this. It is possible to employ a configuration in which only a light reception state is transmitted from the light receiver 1 to the light projector 2, and the display control section 202 of the light projector 2 synchronizes display on the display section 120 with display on the display section 220.

[Reasons for Displaying Light Reception State One Cycle Later]

Figure 3:
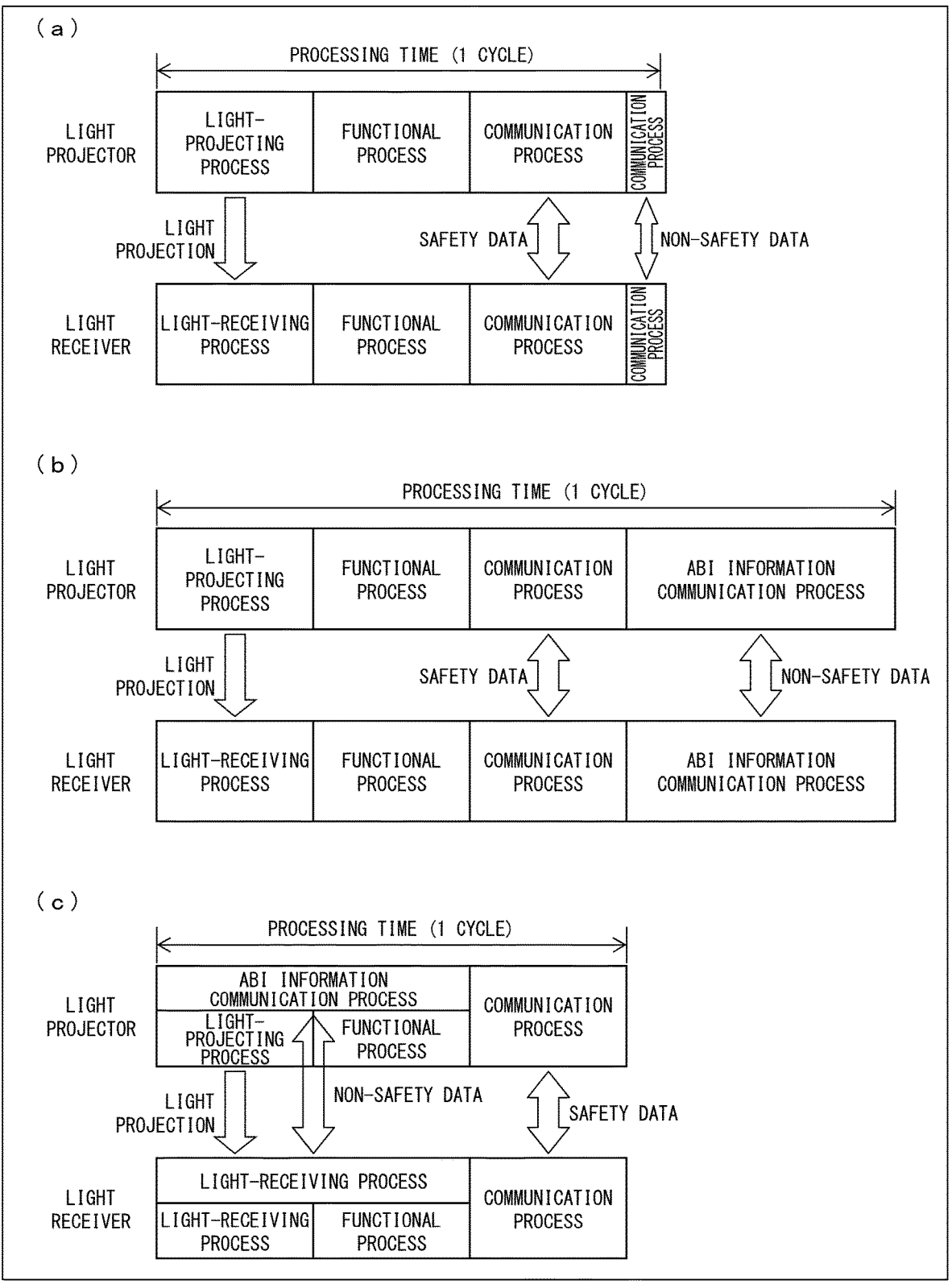
FIG. 3 is a diagram for explaining process contents of cycle in the multiple-optical-axis photoelectric sensor. (a) of FIG. 3 illustrates contents of light processing in 1 cycle in a conventional technique. (b) of FIG. 3 is a diagram for explaining a problem caused in a case where processes of generating and transmitting ABI information in accordance with Embodiment 1 are included in the conventional technique. (c) of FIG. 3 illustrates process contents of 1 cycle in accordance with the present invention.

Next, with reference to FIG. 3, the following description will discuss a reason why a light reception state of a previous cycle is displayed one cycle later in cycles of the light projecting/receiving process on the display section 120 and on the display section 220. FIG. 3 is a diagram for explaining process contents of 1 cycle in the multiple-optical-axis photoelectric sensor. (a) of FIG. 3 illustrates contents of light processing in 1 cycle in a conventional technique. (b) of FIG. 3 is a diagram for explaining a problem caused in a case where processes of generating and transmitting ABI information in accordance with Embodiment 1 are included in the conventional technique. (c) of FIG. 3 illustrates process contents of 1 cycle in accordance with the present invention.

As illustrated in (a) of FIG. 3, in 1 cycle in the conventional technique, a light projector carries out a light-projecting process, a functional process, a communication process (safety data), and a communication process (non-safety data). Moreover, in the 1 cycle, a light receiver carries out a light-receiving process, a functional process, a communication process (safety data), and a communication process (non-safety data). That is, the processes are carried out as follows: in 1 cycle, the light projecting/receiving process is first carried out, then the functional process, the communication process of safety data, and the communication process of non-safety data are carried out, and then the light projecting/receiving process is carried out again in the next cycle. Here, the safety data is data that is directly related to safety and requires an urgent communication process. The non-safety data is data that is not directly related to safety, and does not cause any serious problem even if the communication process is delayed.

In a case where the communication process of ABI information, which is non-safety data, is added to the conventional technique, the processing time of 1 cycle becomes much longer than that of the conventional technique, as illustrated in (b) of FIG. 3. This is because ABI information indicates reception states of the respective light receiving sections 110 and has a large amount of data. Moreover, the ABI information is data that increases in size as the number of light receiving sections 110 increases.

In view of this, in Embodiment 1, the communication process of ABI information is carried out between the light projecting/receiving process and the functional process in 1 cycle (see (c) of FIG. 3). Note that a light reception state during the light projecting/receiving process cannot be grasped. Therefore, a light reception state of one previous cycle is communicated as ABI information. From this, the communication process of ABI information can be carried out without extending a period of 1 cycle as compared with the conventional technique.

That is, according to Embodiment 1, the display control section 103 and the ABI information transmitting section 105 carry out (i) the process of transmitting an instruction (ABI information) for causing the display section 220 to display the light reception state of one previous cycle to the light projector 2 in parallel with (ii) the process in relation to light reception in the current cycle.

§ 3 Operation Example

[Flow of Processes in Multiple-Optical-Axis Photoelectric Sensor 10]

Figure 4:
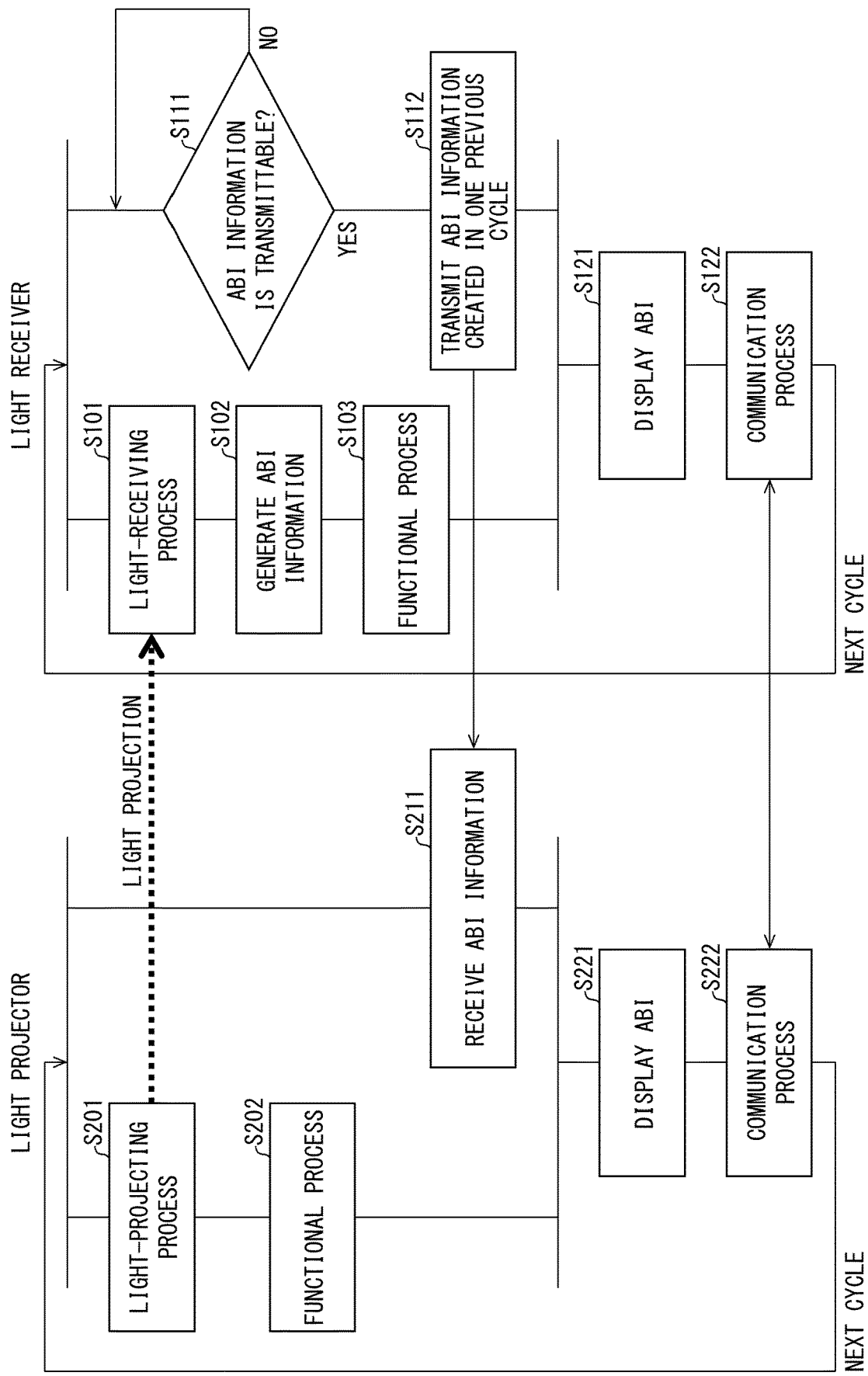
FIG. 4 is a sequence diagram illustrating a flow of processes of the multiple-optical-axis photoelectric sensor.

Next, the following describes a flow of processes in the multiple-optical-axis photoelectric sensor 10 with reference to FIG. 4. FIG. 4 is a sequence diagram illustrating a flow of processes of the multiple-optical-axis photoelectric sensor 10.

The multiple-optical-axis photoelectric sensor 10 carries out the light projecting/receiving process in predetermined cycles. FIG. 4 shows a flow of processes in 1 cycle. As illustrated in FIG. 4, in a certain cycle, the light-receiving process section 101 in the light receiver first carries out a light-receiving process (S101). With use of a result of the light-receiving process, the ABI information generating section 102 generates ABI information (S102). Then, the functional process section 104 carries out a functional process (S103). In parallel with the processes in the steps S101 through S103, the light receiver 1 determines whether or not the ABI information transmitting section 105 is ready to transmit ABI information (S111). In a case where the light receiver 1 has determined that the ABI information transmitting section 105 is in a transmittable state (YES in S111), the ABI information transmitting section 105 transmits, to the light projector 2, ABI information which has been generated by the ABI information generating section 102 in one previous cycle (S112). Subsequently, the display control section 103 causes the display section 120 to display a light reception state based on the ABI information generated in the one previous cycle (S121). The communication process of safety data is carried out between the light receiver 1 and the light projector 2 (S122), and the process proceeds to a next cycle.

In the light projector 2, first, the light-projecting process section 201 carries out the light-projecting process (S201), and then the functional process section 204 carries out the functional process (S202). In parallel with the steps S201 and S202, the ABI information obtaining section 203 obtains ABI information from the light receiver 1 (S211). The ABI information obtained in the step S211 is ABI information of one previous cycle.

Subsequently, the display control section 202 of the light projector 2 carries out display of the light reception state of the light receiving section 110 with use of the ABI information obtained in the step S211 (S221). The communication process of safety data is carried out between the light receiver 1 and the light projector 2 (S222), and the process proceeds to a next cycle.

[Display Example in Display Section]

Figure 5:
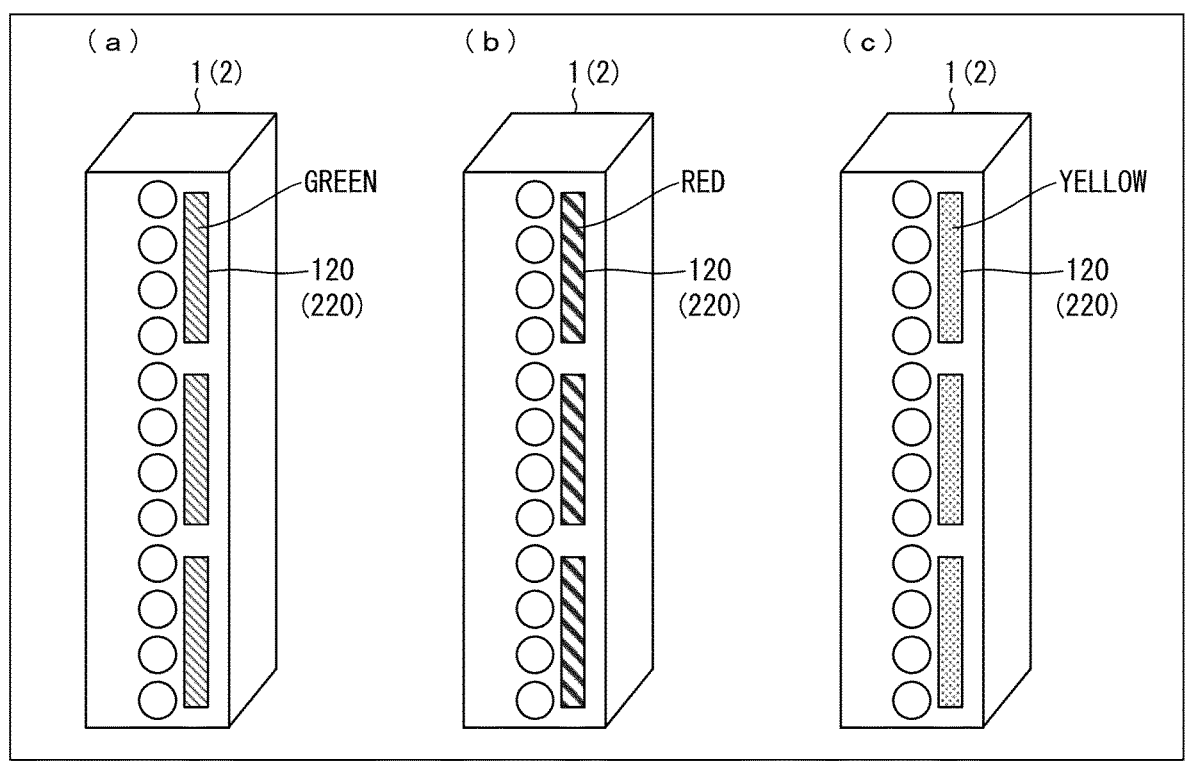
FIG. 5 is a diagram illustrating a display example of display sections of a light projector and a light receiver which are included in the multiple-optical-axis photoelectric sensor.

Next, the following describes a display example in the display section 120 (220) with reference to FIG. 5. FIG. 5 is a diagram illustrating a display example of the display section 120 (220).

In Embodiment 1, the display section 120 can indicate a light reception state by changing colors to be displayed, or can indicate a light reception state by switching between lighting and blinking. For example, the following configuration can be employed: that is, in a case where light reception states are indicated in 3 levels, a good light reception state is indicated in green ((a) of FIG. 3); a bad light reception state is indicated in red ((b) of FIG. 3); and a light reception state which is neither good nor bad is indicated in yellow ((c) of FIG. 3).

Alternatively, in a case where light reception states are indicated in 2 levels, it is possible to employ a configuration in which a good light reception state is indicated by causing the display section 120 (220) to light, and a bad light reception state is indicated by causing the display section 120 (220) to blink. Alternatively, light reception states can be indicated in a plurality of levels by changing intervals of blinking.

As described above, the multiple-optical-axis photoelectric sensor 10 in accordance with Embodiment 1 allows the user to recognize a light reception state of a light receiving section 110 at a position corresponding to a position at which the light receiving section 110 is provided. Thus, for example, before the multiple-optical-axis photoelectric sensor 10 malfunctions because the light receiving section 110 gets dirty or the like, it is possible to facilitate identification and maintenance of the dirty spot (e.g., cleaning of an optical surface, readjustment of optical axis, replacement, or the like). From this, it is possible to prevent a malfunction in advance.

In many cases, the multiple-optical-axis photoelectric sensor 10 is provided at a large-scale production site or the like. In a case where the production facility stops due to the operation of the multiple-optical-axis photoelectric sensor 10, such a case has a greater impact. As described above, since the multiple-optical-axis photoelectric sensor 10 in accordance with Embodiment 1 allows the user to recognize the light reception state of the light receiving section before the production facility or the like stops, such an adverse effect can be prevented in advance.

As such, the display section 120 can display the light reception state of the light receiving section 110 by changing colors to be displayed, by switching between lighting and blinking, or by combining these.

§ 4 Modification Example

In the above described embodiment, the configuration has been described in which one light receiver 1 and one light projector 2 are included in the multiple-optical-axis photoelectric sensor 10. Note, however, that the present invention is not limited to this configuration. The multiple-optical-axis photoelectric sensor 10 can be configured to include a plurality of light receivers 1 and a plurality of light projectors 2.

Figure 6:
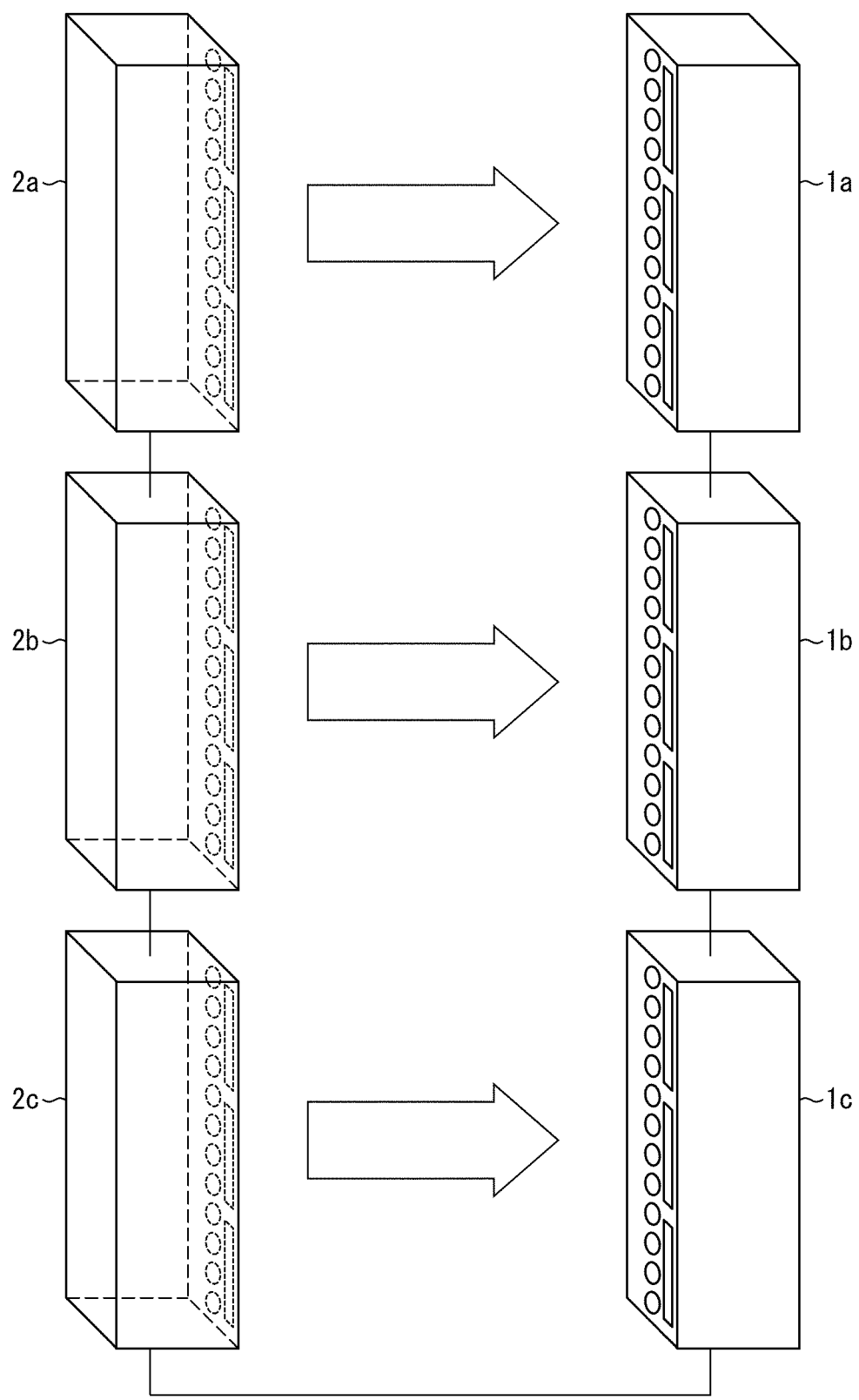
FIG. 6 is a diagram illustrating a modification example of Embodiment 1.

FIG. 6 illustrates an example in which three light receivers 1 and three light projectors 2 are provided. In FIG. 6, as an example, a light receiver 1a, a light receiver 1b, and a light receiver 1c are provided as the light receiver 1, and a light projector 2a, a light projector 2b, and a light projector 2c are provided as the light projector 2.

In the example illustrated in FIG. 6, the light receiver 1a, the light receiver 1b and the light receiver 1c are connected in series, the light projector 2a, the light projector 2b, and the light projector 2c are connected in series, and the light receiver 1c and the light projector 2c are communicably connected.

In the example illustrated in FIG. 6, the light receiver 1a and the light projector 2a correspond to each other (i.e., light projected from the light projector 2a is received by the light receiver 1a), the light receiver 1b and the light projector 2b correspond to each other, and the light receiver 1c and the light projector 2c correspond to each other. A light reception state in the light receiver 1a is displayed on a display section 120 of the light receiver 1a and on a display section 220 of the light projector 2a. A light reception state in the light receiver 1b is displayed on a display section 120 of the light receiver 1b and on a display section 220 of the light projector 2b. A light reception state in the light receiver 1c is displayed on a display section 120 of the light receiver 1c and on a display section 220 of the light projector 2c.

Thus, in a case where the plurality of light receivers 1 and the plurality of light projectors 2 are provided, a light reception state of each light receiver 1 is displayed in the light receiver 1 and in a light projector 2 corresponding to that light receiver 1.

According to the configuration, the user can easily recognize which light receiving section 110 of which light receiver 1 is in a bad light reception state.

The present invention can be described as follows:

The multiple-optical-axis photoelectric sensor in accordance with an aspect of the present invention includes: a light projector; a light receiver; a plurality of light receiving sections; a light receiver display section which is provided in the vicinity of a corresponding light receiving section among the plurality of light receiving sections, the light receiver display section displaying a light reception state of the corresponding light receiving section; a light projector display section which displays the light reception state; and a display synchronizing section which causes the light projector display section and the light receiver display section to simultaneously display the light reception state.

According to the configuration, a light reception state of the light receiving section (light receiving element) is displayed on the light receiver display section provided in the vicinity of the light receiving section. From this, the user can easily recognize which light receiving section is in what light reception state. In other words, the user can easily recognize which light receiving section is in a good or bad light reception state by checking the display section.

Moreover, on the light projector display section also, the light reception state of the light receiving section is displayed simultaneously with the light receiver display section. Therefore, the user can recognize the light reception state of the light receiving section by checking either the light projector or the light receiver.

According to the multiple-optical-axis photoelectric sensor in accordance with an aspect of the present invention, it is possible that the display synchronizing section is provided in the light receiver. From this, synchronization with display in the light projector can be carried out by the light receiver which can determine a light reception state.

According to the multiple-optical-axis photoelectric sensor in accordance with an aspect of the present invention, it is possible that the plurality of light receiving sections are arranged in a row; and the light receiver display section is provided in parallel with a direction, in which the row extends, such that one light receiver display section corresponds to two or more light receiving sections, the one light receiver display section being said light receiver display section, and the two or more light receiving sections being included in the plurality of light receiving sections.

According to the configuration, the user can appropriately recognize light reception states of the plurality of light receiving sections by checking one display section.

According to the multiple-optical-axis photoelectric sensor in accordance with an aspect of the present invention, it is possible that each of the plurality of light receiving sections carries out a light-receiving process in predetermined cycles; and the light receiver display section displays, in a current cycle, a light reception state of one previous cycle.

According to the configuration, the light reception state of one previous cycle is displayed in the current cycle. From this, it is not necessary to carry out communication for transmitting a light reception state of the current cycle from the light receiver to the light projector during the current cycle for displaying the light reception state of the current cycle during the current cycle. This makes it possible to prevent a period of current cycle from becoming longer. As such, it is possible to cause the light projector and the light receiver to display the light reception state of the light receiving section without extending the period of the cycle of projecting/receiving light.

According to the multiple-optical-axis photoelectric sensor in accordance with an aspect of the present invention, it is possible that the light receiver carries out (i) transmission of an instruction on causing the light projector display section to display the light reception state of the one previous cycle in parallel with (ii) a process relating to reception of light in the current cycle.

According to the configuration, the process in relation to receiving light is carried out in parallel with the process of transmitting a light reception state of one previous cycle. This makes it possible to prevent the cycle of projecting/receiving light from becoming longer.

According to the multiple-optical-axis photoelectric sensor in accordance with an aspect of the present invention, it is possible that at least one of the light receiver display section and the light projector display section carries out display by changing colors to be displayed, by switching between lighting and blinking, or by combining these, in accordance with the light reception state.

According to the configuration, the user can appropriately recognize the light reception state of the light receiving section. Moreover, in a case where a color to be displayed is changed in accordance with a level of the light reception state, the user can promptly recognize that the light reception state is deteriorated.

§ 5 Other Example

[Example of Configuration Achieved by Software]

The control blocks (in particular, the control section 100 (light-receiving process section 101, ABI information generating section 102, display control section 103, functional process section 104, ABI information transmitting section 105) and the control section 200 (light-projecting process section 201, display control section 202, ABI information obtaining section 203, functional process section 204)) of the light receiver 1 and the light projector 2 can be realized by a logic circuit (hardware) provided in an integrated circuit (IC chip) or the like or can be alternatively realized by software.

In the latter case, each of the light receiver 1 and the light projector 2 includes a computer that executes instructions of a program that is software realizing the foregoing functions. The computer includes, for example, at least one processor and a computer-readable storage medium storing the program. In a case where the processor in the computer reads out the program from the storage medium and executes the program, the object of the present invention is achieved. The processor can be, for example, a central processing unit (CPU). The storage medium can be a "non-transitory tangible medium" such as, for example, a tape, a disk, a card, a semiconductor memory, a programmable logic circuit, or the like, as well as a read only memory (ROM) or the like. The computer can further include a random access memory (RAM) in which the program is loaded. The program can be made available to the computer via any transmission medium (such as a communication network or a broadcast wave) that can transmit the program. Note that an aspect of the present invention can also be achieved in the form of a computer data signal in which the program is embodied via electronic transmission and which is embedded in a carrier wave.

The present invention is not limited to the embodiments, but can be altered by a skilled person in the art within the scope of the claims. The present invention also encompasses, in its technical scope, any embodiment derived by combining technical means disclosed in differing embodiments.

REFERENCE SIGNS LIST 1 (1a, 1b, 1c): Light receiver
10: Multiple-optical-axis photoelectric sensor
100: Control section
101: Light-receiving process section
102: ABI information generating section
103: Display control section (display synchronizing section)
104: Functional process section
105: ABI information transmitting section (display synchronizing section)
110: Light receiving section
120: Display section (light receiver display section)
130: Communication section
140: ABI information buffer
2 (2a, 2b, 2c): Light projector
200: Control section
201: Light-projecting process section
203: ABI information obtaining section
204: Functional process section
210: Light projecting section
202: Display control section
220: Display section (light projector display section)

The invention claimed is:

1. A multiple-optical-axis photoelectric sensor comprising:
   a light projector;
   a light receiver;
   a plurality of light receiving sections;
   a light receiver display section which is provided in the vicinity of a corresponding light receiving section among the plurality of light receiving sections, the light receiver display section displaying a light reception state of the corresponding light receiving section;
   a light projector display section which displays the light reception state; and
   a display synchronizing section which causes the light projector display section and the light receiver display section to simultaneously display the light reception state, wherein
   each of the plurality of light receiving sections carries out a light-receiving process in predetermined cycles,
   the light receiver display section displays, in a current cycle, a light reception state of one previous cycle, and
   the light receiver carries out transmission of an instruction on causing the light projector display section to display the light reception state of the one previous cycle in parallel with a process relating to reception of light in the current cycle.

2. The multiple-optical-axis photoelectric sensor as set forth in claim 1, wherein the display synchronizing section is provided in the light receiver.

3. The multiple-optical-axis photoelectric sensor as set forth in claim 1, wherein:
   the plurality of light receiving sections are arranged in a row; and
   the light receiver display section is provided in parallel with a direction, in which the row extends, such that one light receiver display section corresponds to two or more light receiving sections, the one light receiver display section being said light receiver display section, and the two or more light receiving sections being included in the plurality of light receiving sections.

4. The multiple-optical-axis photoelectric sensor as set forth in claim 1, wherein at least one of the light receiver display section and the light projector display section carries out display by changing colors to be displayed, by switching between lighting and blinking, or by combining these, in accordance with the light reception state.

* * * * *